US012520773B1

(12) United States Patent
Foster et al.

(10) Patent No.: US 12,520,773 B1
(45) Date of Patent: Jan. 13, 2026

(54) PRUNER WITH GEARED MECHANISM

(71) Applicant: WOODLAND TOOLS, INC., Madison, WI (US)

(72) Inventors: Charlton G. A. Foster, Middleton, WI (US); James W. Meiller, Fitchburg, WI (US)

(73) Assignee: Woodland Tools, Inc., Madison, WI (US)

( * ) Notice: Subject to any disclaimer, the term of this patent is extended or adjusted under 35 U.S.C. 154(b) by 406 days.

(21) Appl. No.: 18/172,758

(22) Filed: Feb. 22, 2023

Related U.S. Application Data

(60) Provisional application No. 63/398,140, filed on Aug. 15, 2022.

(51) Int. Cl.
*A01G 3/02* (2006.01)

(52) U.S. Cl.
CPC .............. *A01G 3/021* (2013.01); *A01G 3/02* (2013.01)

(58) Field of Classification Search
CPC .......... A01G 3/02; A01G 3/021; A01G 3/025; A01G 3/0251; B26B 13/04; B26B 13/12; B26B 13/16; B26B 13/18; B26B 13/28
See application file for complete search history.

(56) References Cited

U.S. PATENT DOCUMENTS

| | | | | |
|---|---|---|---|---|
| 26,955 A * | 1/1860 | Smith | ................... | A01G 3/025 30/238 |
| 31,849 A * | 3/1861 | Knapp | ................... | A01G 3/02 30/239 |
| 103,327 A * | 5/1870 | Hatfield | ................... | A01G 3/02 30/239 |
| 105,601 A * | 7/1870 | Seeley | ................... | A01G 3/025 30/238 |
| 246,399 A * | 8/1881 | Layman | ................. | A01G 3/021 30/250 |
| 326,314 A * | 9/1885 | McKay | ................. | A01G 3/025 30/237 |

(Continued)

FOREIGN PATENT DOCUMENTS

| | | | | |
|---|---|---|---|---|
| DE | 2937801 A1 * | 4/1981 | ............... | A01G 3/02 |
| DE | 29712280 U1 * | 9/1997 | ........... | A01G 3/0251 |

(Continued)

*Primary Examiner* — Jason Daniel Prone
(74) *Attorney, Agent, or Firm* — Yanjun Ma; Charles S. Sara; DeWitt LLP

(57) ABSTRACT

A pruner includes a stationary unit, a movable unit, and a driving unit, wherein the stationary unit is pivotally connected to the movable unit, and the movable unit is pivotally connected to the driving unit. The pruner is operated by a geared mechanism wherein movement of a second handle on the driving unit drives movement of a second blade on the movable unit towards a first blade on the stationary unit through engagement of a second transmission gear on the driving unit with a first transmission gear on the stationary unit. The pruner further includes a first sliding groove on the stationary unit, a second sliding groove on the movable unit, and a variable gate opening button penetrating the sliding grooves. The configuration allows for adjustment of the span between the handles by setting the variable gate opening button at different positions of the first sliding groove.

15 Claims, 5 Drawing Sheets

(56) References Cited

U.S. PATENT DOCUMENTS

| | | | | |
|---|---|---|---|---|
| 639,468 | A * | 12/1899 | Trieschmann | A01G 3/025 30/252 |
| 639,469 | A * | 12/1899 | Trieschmann | A01G 3/025 30/252 |
| 713,595 | A * | 11/1902 | Broman | A01G 3/025 30/252 |
| 777,567 | A * | 12/1904 | Taylor et al. | A01G 3/02 30/239 |
| 1,137,380 | A * | 4/1915 | Buell | A01G 3/025 30/250 |
| 1,210,128 | A * | 12/1916 | Woolf | A01G 3/025 30/252 |
| 1,597,859 | A * | 8/1926 | Jardine | A01G 3/02 30/262 |
| 1,716,180 | A * | 6/1929 | Marler | A01G 3/0251 30/186 |
| 2,574,354 | A * | 11/1951 | Smith | A01G 3/02 30/186 |
| 3,324,549 | A * | 6/1967 | Sharp | A01G 3/02 30/181 |
| 5,469,625 | A * | 11/1995 | Melter | A01G 3/02 30/190 |
| 5,689,888 | A * | 11/1997 | Linden | A01G 3/0251 30/192 |
| 5,809,654 | A * | 9/1998 | Huang | A01G 3/0251 30/250 |
| 6,345,446 | B1 * | 2/2002 | Huang | A01G 3/0251 30/192 |
| 6,757,979 | B1 * | 7/2004 | Schneider | A01G 3/02 30/186 |
| 6,964,099 | B1 * | 11/2005 | Zeng | A01G 3/02 30/260 |
| 7,895,757 | B1 * | 3/2011 | Huang | A01G 3/02 30/192 |
| 8,220,164 | B2 * | 7/2012 | Linden | A01G 3/0251 30/340 |
| 8,266,804 | B2 * | 9/2012 | Huang | A01G 3/02 30/190 |
| 8,327,549 | B2 * | 12/2012 | Huang | A01G 3/0251 30/190 |
| 8,458,912 | B2 * | 6/2013 | Linden | A01G 3/02 30/131 |
| 8,601,698 | B2 * | 12/2013 | Huang | A01G 3/02 30/186 |
| 8,732,960 | B2 * | 5/2014 | Wang | A01G 3/021 30/244 |
| 9,003,667 | B2 * | 4/2015 | Huang | A01G 3/02 30/261 |
| 9,066,473 | B2 * | 6/2015 | Podlesny | A01G 3/02 |
| 9,426,945 | B2 * | 8/2016 | Hsu | A01G 3/021 |
| 9,848,539 | B2 * | 12/2017 | Lin | A01G 3/02 |
| 10,136,583 | B2 * | 11/2018 | Dechant | A01G 3/021 |
| D875,483 | S * | 2/2020 | Roberts | D8/5 |
| 11,324,169 | B2 * | 5/2022 | Huang | A01G 3/025 |
| D986,024 | S * | 5/2023 | Barrette | D8/5 |
| D1,015,092 | S * | 2/2024 | Barrette | D8/5 |
| 12,268,131 | B2 * | 4/2025 | Heine | A01G 3/021 |
| 2006/0026845 | A1 * | 2/2006 | Lin | A01G 3/0251 30/249 |
| 2008/0115368 | A1 * | 5/2008 | Shan | A01G 3/02 30/249 |
| 2008/0155835 | A1 * | 7/2008 | Lin | A01G 3/02 30/252 |
| 2009/0090010 | A1 * | 4/2009 | Lin | A01G 3/02 30/341 |
| 2010/0269357 | A1 * | 10/2010 | Shan | A01G 3/0251 30/254 |
| 2015/0313089 | A1 * | 11/2015 | Cecchi | A01G 3/02 30/228 |

FOREIGN PATENT DOCUMENTS

| | | | | |
|---|---|---|---|---|
| DE | 102006060420 | A1 * | 6/2008 | A01G 3/02 |
| DE | 202013104102 | U1 * | 11/2013 | A01G 3/02 |
| EP | 1625784 | A1 * | 2/2006 | A01G 3/0251 |
| FR | 2208328 | A5 * | 6/1974 | A01G 3/02 |
| GB | 622598 | A * | 5/1949 | A01G 3/02 |
| GB | 1443401 | A * | 7/1976 | A01G 3/02 |
| GB | 2030502 | A * | 4/1980 | A01G 3/02 |
| GB | 2270489 | A * | 3/1994 | A01G 3/02 |
| GB | 2478176 | A * | 8/2011 | A01G 3/0251 |
| GB | 2578933 | A * | 6/2020 | A01G 3/0251 |

* cited by examiner

PRUNER WITH GEARED MECHANISM

CROSS-REFERENCE TO RELATED APPLICATION

The application claims priority to U.S. provisional application Ser. No. 63/398,140, filed Aug. 15, 2022, which is incorporated herein by reference in its entirety.

FIELD OF THE INVENTION

The present disclosure is directed to a pruner, specifically a pruner that is efficient in operation and allows for adjustment of the span between the handles.

BACKGROUND

A conventional pruner usually comprises two blades pivotally connected at a middle section having a through hole for a screw and a nut, and two handles mounted to the two blades. When in use, the through hole serves as the pivot point to open and close the two blades to perform a cutting action. The conventional pruner does not operate in an energy saving manner and usually has increased difficulty in cutting larger branches. Some of the pruners have a rotating handle design which is very unnatural feel and can only be used by right-handed users. The span between the handles is fixed and cannot fit to larger or smaller hands of users, which increases the difficulty of using the tool.

Thus, there is an unmet need in the art for pruners that are efficient in operation and have more versatility to be used by a variety of users.

SUMMARY OF THE INVENTION

Disclosed herein is a pruner having a geared mechanism to aid in efficient operation and a variable gate opening button combined with the gears to allow adjusting the span between the handles. The pruner 1 comprises:
- a first unit 10 having a first blade 11 at a front portion thereof, a first pivot hole 12 at a middle-front portion thereof, a first sliding groove 13 at a middle-rear portion thereof, a first transmission gear 14 at a middle portion thereof and positioned for engagement with a second transmission gear 34 of a driving unit 30, and a first handle 15 at a rear portion thereof;
- a second unit 20 having a second blade 21 at a front portion thereof, a second pivot hole 22 at a middle-front portion thereof, a second sliding groove 23 at a middle-rear portion thereof, and a third pivot hole 26 at a rear portion thereof; and
- the driving unit 30 having the second transmission gear 34 at a front portion thereof, a fourth pivot hole 36 at a middle portion thereof, and a second handle 35 at a rear portion thereof.

The first unit 10 is pivotally connected to the second unit 20 by aligning the first pivot hole 12 with the second pivot hole 22 to allow connection by a first pivot unit 121.

The second unit 20 is pivotally connected to the driving unit 30 by aligning the third pivot hole 26 with the fourth pivot hole 36 to allow connection by a second pivot unit 261.

The second blade 21 of the moveable unit 20 is driven by the second handle 35 of the driving unit 30 through the engagement of the second transmission gear 34 and the first transmission gear 14 to pivotally move toward the first blade 11 to complete a cut.

The pruner 1 further comprises a leaf spring 50 between the first unit 10 and the second unit 20 that acts upon the second unit 20 to move the second handle 35 away from the first handle 15 after the cut.

The first sliding groove 13 overlaps with the second sliding groove 23 when the first handle 15 and the second handle 35 are closed, and when the second handle 35 moves away from the first handle 15, the relative position between the first sliding groove 13 and the second sliding groove 23 changes, thereby altering the location of their overlap or decreasing the degree of their overlap.

The pruner 1 further comprises a variable gate opening button 43 penetrating the first sliding groove 13 and the second sliding groove 23, wherein the variable gate opening button 43 has a first end 431 penetrating the first sliding groove 13 and a second end 432 penetrating the second sliding groove 23.

The first sliding groove 13 has a rear end 131 and a front end 132. The variable gate opening button 43 is at a first position in which the first end 431 of the variable gate opening button 43 engages the rear end 131 of the first sliding groove 13, and at a second position in which the first end 431 of the variable gate opening button 43 engages the front end 132 of the first sliding groove 13. The pruner 1 allows for adjustment of the span between the first handle 15 and the second handle 35 by setting the variable gate opening button 43 at the first position, the second position, or any intermediate position between the first position and the second position of the first sliding groove 13.

When the variable gate opening button 43 is set at the first position, the pruner 1 has a smallest span between the first handle 15 and the second handle 35. At this setting, the second handle 35 moves away from the first handle 15 to reach a maximum distance when the second end 432 of the variable gate opening button 43 engages a rear position 231 of the second sliding groove 23 to prohibit further movement of the second blade 21 away from the first blade 11.

When the variable gate opening button 43 is set at the second position, the pruner 1 has a largest span between the first handle 15 and the second handle 35. At this setting, the second handle 35 moves away from the first handle 15 to reach a maximum distance when the second end 432 of the variable gate opening button 43 engages a front position 232 of the second sliding groove 23 to prohibit further movement of the second blade 21 away from the first blade 11.

When the variable gate opening button 43 is set at an intermediate position between the first position and the second position, the pruner 1 has an intermediate span between the first handle 15 and the second handle 35. At this setting, the second handle 35 moves away from the first handle 15 to reach a maximum distance when the second end 432 of the variable gate opening button 43 engages an intermediate position of the second sliding groove 23 to prohibit further movement of the second blade 21 away from the first blade 11.

The pruner 1 further comprises a locking groove 27 at a middle portion of the second unit 20 and disposed on a side opposite the second blade 21, and a locking button 47 having a front portion 471, wherein the front portion 471 engages with the locking groove 27 to prohibit movement of the second blade 21 of the second unit 20 relative to the first blade 11 of the first unit 10.

In some embodiments, the first blade 11 is a hook without a sharp portion. In some embodiments, the first handle 15 and the second handle 35 are each coupled with a first handle sheath 151 and a second handle sheath 351 for holding by a user. In some embodiments, the pruner 1 further comprises a housing 451 that covers the middle portion of the first unit 10 and the second unit 20, wherein the housing 451 comprises an opening through which the first sliding groove 13 is exposed and accessible.

The objects and advantages of the disclosure will appear more fully from the following detailed description of the preferred embodiment of the disclosure made in conjunction with the accompanying drawings.

DETAILED DESCRIPTION OF THE INVENTION

Figure 1:
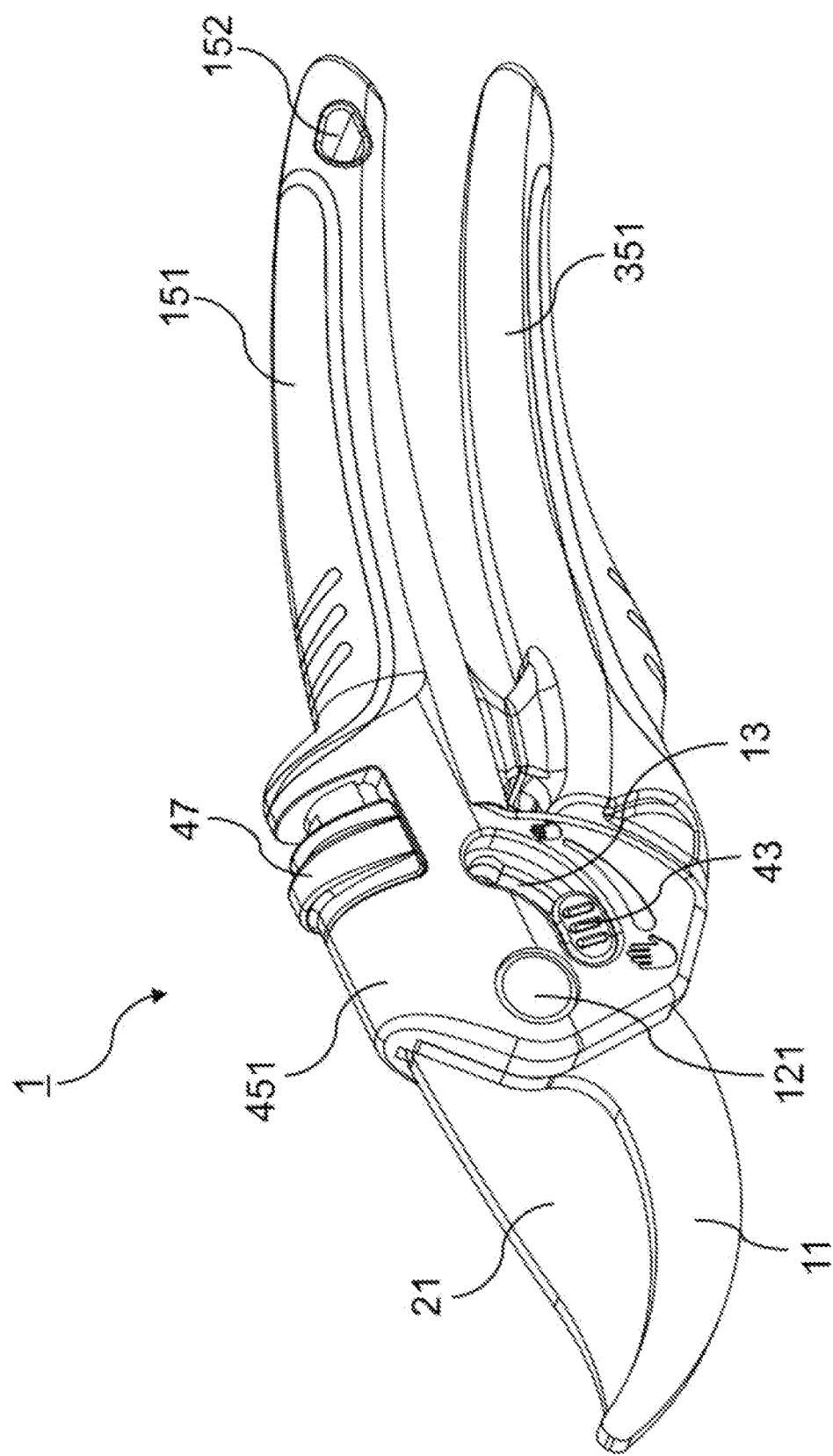
FIG. 1 is a perspective view of the pruner according to a preferred embodiment of the present disclosure.
Figure 2:
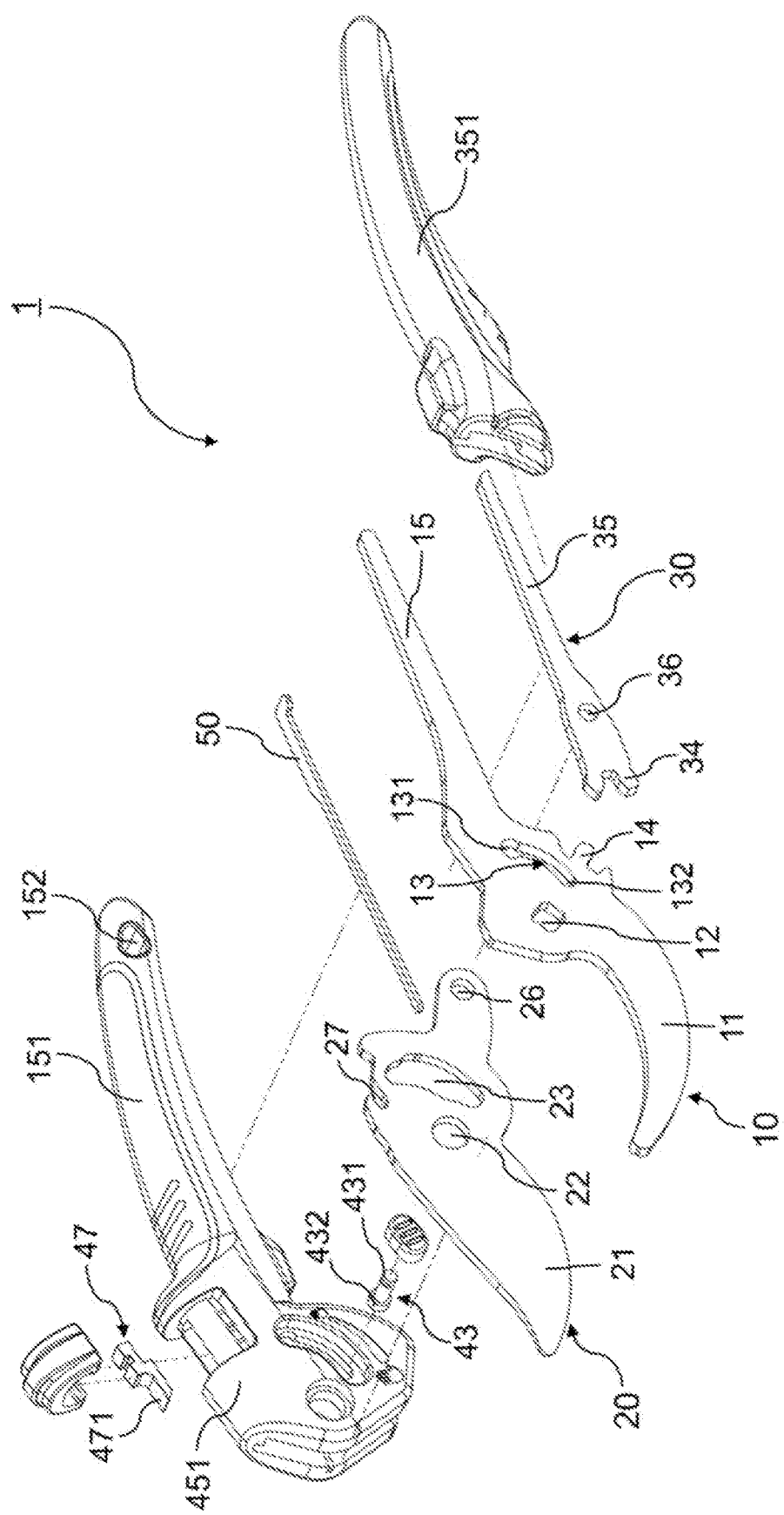
FIG. 2 is an exploded view of the pruner according to the preferred embodiment of the present disclosure.

Referring to FIGS. 1-5, a preferred embodiment of the present disclosure includes a pruner 1 comprising a first unit 10, a second unit 20, and a driving unit 30. As shown in FIG. 2, the first unit 10 has a first blade 11 at a front portion thereof, a first pivot hole 12 at a middle-front portion thereof, a first sliding groove 13 at a middle-rear portion thereof, a first transmission gear 14 at a middle portion thereof and positioned for engagement with a second transmission gear 34 of a driving unit 30, and a first handle 15 at a rear portion thereof. The second unit 20 has a second blade 21 at a front portion thereof, a second pivot hole 22 at a middle-front portion thereof, a second sliding groove 23 at a middle-rear portion thereof, and a third pivot hole 26 at a rear portion thereof. The driving unit 30 has a second transmission gear 34 at a front portion thereof, a fourth pivot hole 36 at a middle portion thereof, and a second handle 35 at a rear portion thereof. In some embodiments, the first blade 11 is a hook without a sharp edge.

Figure 3:
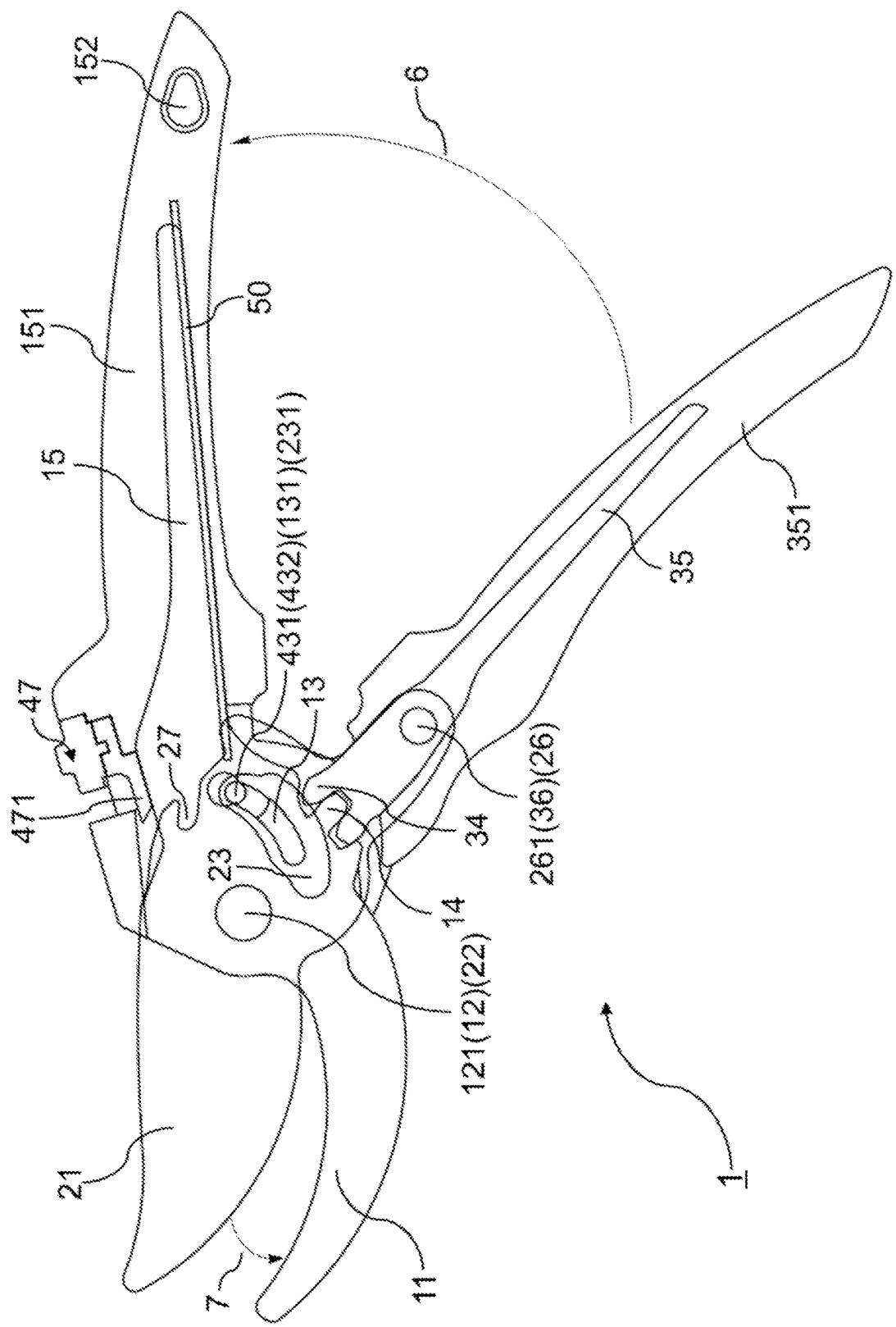
FIG. 3 is a schematic drawing of the pruner according to the preferred embodiment of the present disclosure when the pruner is unlocked and the handles are fully open, and the variable gate opening button is set at the first position of the first sliding groove.
Figure 4:
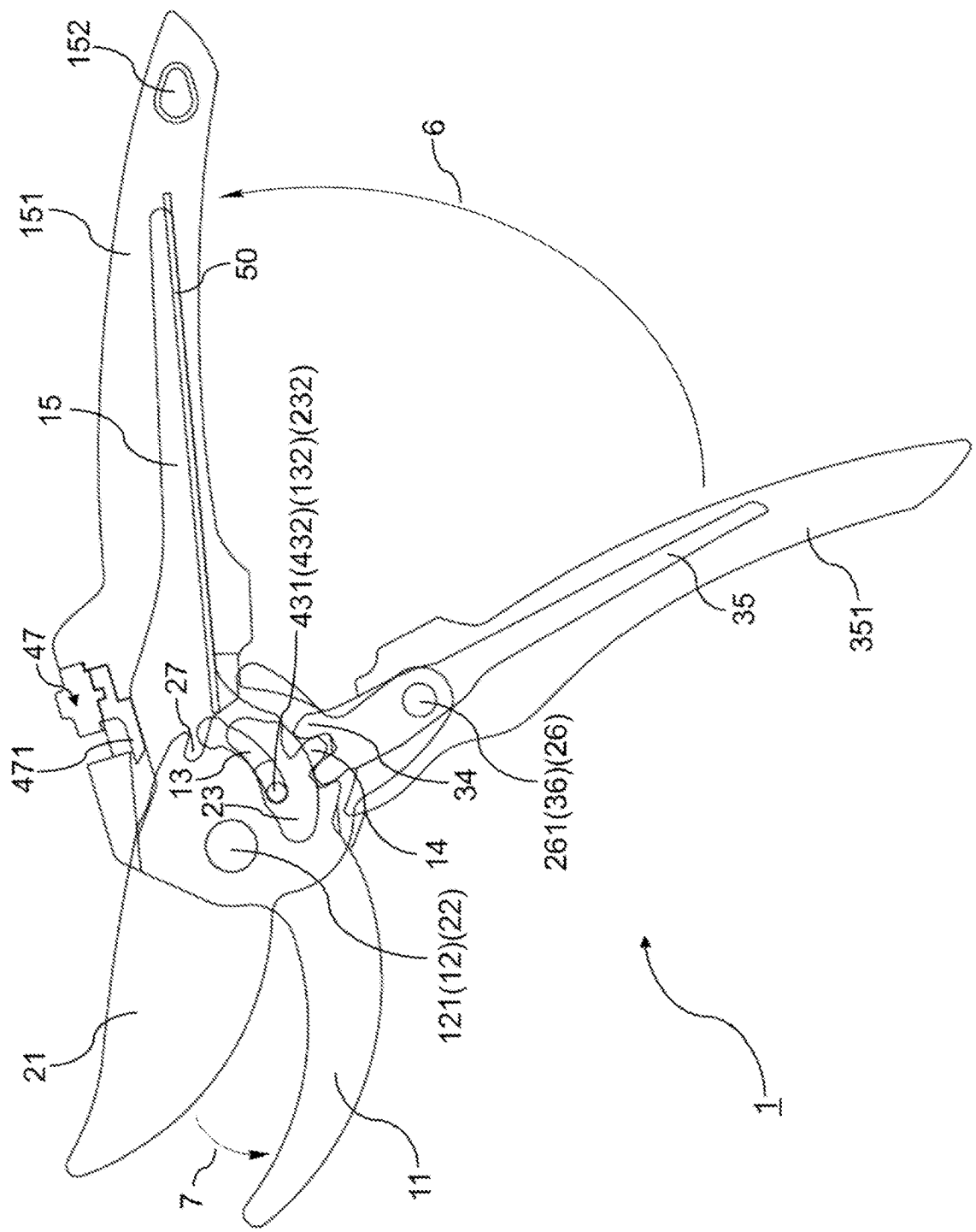
FIG. 4 is a schematic drawing of the pruner according to the preferred embodiment of the present disclosure when the pruner is unlocked and the handles are fully open, and the variable gate opening button is set at the second position of the first sliding groove.

The first unit 10 is pivotally connected to the second unit 20 by aligning the first pivot hole 12 with the second pivot hole 22 to allow connection by a first pivot unit 121 (e.g., a screw or a set of screw and nut; FIGS. 3-4). The second unit 20 is pivotally connected to the driving unit 30 by aligning the third pivot hole 26 with the fourth pivot hole 36 to allow connection by a second pivot unit 261 (e.g., a screw or a set of screw and nut; FIGS. 3-4). The second transmission gear 34 on the driving unit 30 is engaged with the first transmission gear 14 on the first unit 10 through the meshed teeth.

When the pruner 1 is used for cutting, a user closes the first handle 15 and the second handle 35. As shown by the arrow 6 in FIGS. 3 and 4, as the second handle 35 moves toward the first handle 15, the engaged configuration of the second transmission gear 34 on the driving unit 30 with the first transmission gear 14 on the first unit 10 creates force on the fourth pivot hole 36 on the driving unit 30. The fourth pivot hole 36 is connected to the second unit 20 at the third pivot hole 26. Thus, the movement of the second handle 35 drives the movement of the second unit 20, such that the second blade 21 on the second unit 20 moves toward the first blade 11 on the first unit 10 (as shown by the arrow 7 in FIGS. 3 and 4) until the second blade 21 and the first blade 11 are closed to complete the cut. The first blade 11 remains first through the cut.

Figure 5:
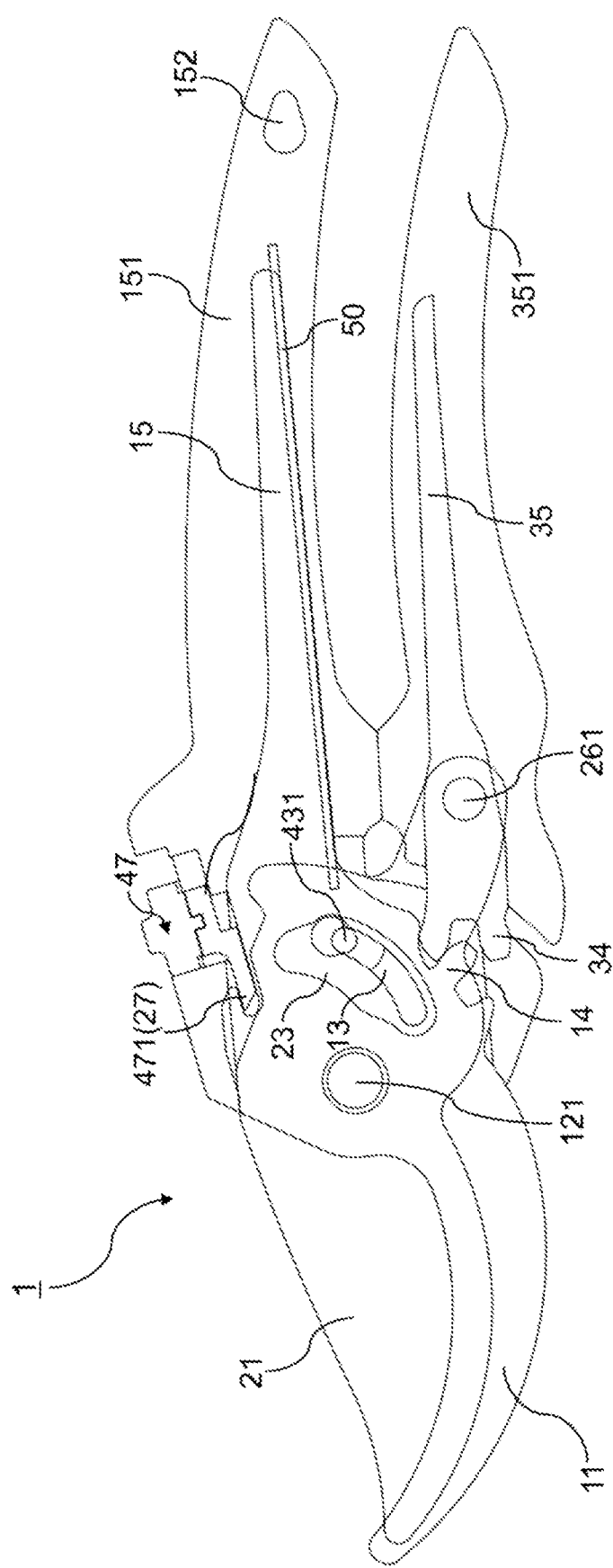
FIG. 5 is a schematic drawing of the pruner according to the preferred embodiment of the present disclosure when the pruner is locked.

The pruner 1 employs the geared mechanism comprising the first transmission gear 14 engaged with the second transmission gear 34. The first transmission gear 14 and the second transmission gear 34 remain engaged throughout the entirety of the movement of the first handle 15 and the second handle 35 between the fully open and fully closed positions (FIGS. 3-5). The configuration of gears amplifies the force applied to the handles and concentrates the maximum force at the center of cut, aiding in a smooth clean feel for the user and an easier cut. The movement of the second handle 35 is on the same plane as the first handle 15 and does not involve self-rotation of the handle, which allows the second handle 35 to travel in a familiar direction when cut, but still give the added power. With the geared mechanism, the pruner 1 is efficient in completing both small and large cuts, making it an all-around tool.

When the second blade 21 and the first blade 11 are closed to complete a cut, the middle portion of the second unit 20 pushes a leaf spring 50 between the first unit 10 and the second unit 20 such that the leaf spring 50 is in tension. Upon finishing the cut and when the user relieves the force on the handles, the leaf spring 50 acts upon the second unit 20 to release the tension and moves the second handle 35 away from the first handle 15, such that the pruner 1 is ready for the next cut.

The pruner 1 further comprises a variable gate opening button 43 arranged in the first sliding grove 13 and the second sliding groove 23 in a penetrating way, allowing a user to adjust the span between the handles. As used herein, the term "span between the handles" refers to the maximum distance that the second handle 35 can move away from the first handle 15. As shown in FIGS. 2-5, the variable gate opening button 43 has a first end 431 and a second end 432. The first end 431 penetrates the first sliding groove 13 and the second end 432 penetrates the second sliding groove 23. The first sliding groove 13 has a rear end 131 and a front end 132. The second sliding groove 23 has a rear position 231—and a front position 232. The variable gate opening button 43 is at a first position in which the first end 431 of the variable gate opening button 43 engages the rear end 131 of the first sliding groove 13, and at a second position in which the first end 431 of the variable gate opening button 43 engages the front end 132 of the first sliding groove 13.

In preferred embodiments, the second sliding groove 23 has an opposing angle relative to the first sliding groove 13. As shown in FIG. 5, when the first handle 15 and the second handle 35 are closed, the first sliding groove 13 overlaps with the second sliding groove 23. As shown in FIGS. 3 and 4, when the second handle 35 moves away from the first handle 15, the relative position between the first sliding groove 13 and second sliding groove 23 changes, thereby altering the location of their overlap or decreasing the degree of their overlap. When the second blade 21 moves to a position where the second end 432 of the variable gate opening button 43 engages with the second sliding groove 23 to prohibit further movement of the second blade 21 away from the first blade 11, the second handle 35 reaches its maximum distance from the first handle 15.

Thus, a user can adjust the span between the handles by actuating the first end 431 of the variable gate opening button 43 to set it at different positions in the first sliding groove 13. The variable gate opening button 43 can be set at the first position, the second position, or any intermediate position between the first and the second positions to adjust the span between the handles.

When the first end 431 of the variable gate opening button 43 is set at the first position, the pruner 1 has a smallest span between the first handle 15 and the second handle 35. As shown in FIG. 3, at this setting, the second end 432 of the variable gate opening button 43 engages with the second sliding groove 23 at the rear position 231 of the second sliding groove 23 and prohibits further movement of the second blade 21 away from the first blade 11. When the first end 431 of the variable gate opening button 43 is set at the second position, the pruner 1 has a largest span between the first handle 15 and the second handle 35. As shown in FIG. 4, at this setting, the second end 432 of the variable gate opening button 43 engages with the second sliding groove 23 at the front position 232 of the second sliding groove 23 and prohibits further movement of the second blade 21 away from the first blade 11. When the first end 431 of the variable gate opening button 43 is set at an intermediate position between the first position and the second position, the pruner 1 has an intermediate span between the first handle 15 and the second handle 35, and the second end 432 of the variable gate opening button 43 engages with the second sliding groove 23 at an intermediate position between the rear position 231 and the front position 232 of the second sliding groove 23.

The variable gate opening button 43 combined with the geared mechanism allows the user to adjust the span between the handles, which gives more versatility, without foregoing any power. The variable hand position on the device allows the user to have the full use of the gears with a wide-open blade or narrow the cut to fit their hand size for easy grip of the device.

The pruner 1 further comprises a locking mechanism comprising a locking groove 27 at a middle portion of the second unit 20 and disposed on a side opposite the second blade and a locking button 47 (FIG. 2). As shown in FIG. 5, when the first handle 15 and the second handle 35 are fully closed, i.e., when the first blade 11 and the second blade 21 are fully closed, the locking groove 27 on the second unit 20 is at a position allowing the user to slide the locking button 47 toward the locking groove 27, such that a front portion 471 of the locking button 47 engages with the locking groove 27 to prohibit movement of the second blade 21 of the second unit 20 relative to the first blade 11 of the first unit 10. To unlock the pruner, the user will squeeze the handles to release the tension between the front portion 471 of the locking button 47 with the locking groove 27, and then slides the locking button 47 backwards to disengage the front portion 471 from the locking groove 27. The locking mechanism adds on safety of the pruner 1 by preventing accidental actuation of the locking button 47 to unlock the device, because a user must firstly grip and squeeze the handles and then actuate the locking button 47 to unlock the pruner.

In preferred versions, the pruner 1 further comprises configurations that increase the comfort use of the device. In some embodiments, the first handle 15 and the second handle 35 are each coupled with a first handle sheath 151 and a second handle sheath 351 for holding by a user. The leaf spring 50 is also hidden in the first handle sheath 151. The first handle sheath 151 or the second handle sheath 351 may comprise a hang hole 152 for the user to hang the device. The pruner 1 may further comprise a housing 451 covering the middle portion of the first unit 10 and the second unit 20 (except that there is an opening on the housing 451 through which the first sliding groove 13 is exposed and accessible) to hide the gears to protect a user from getting caught by the gears. In some embodiments, the housing 451 is connected to the first handle sheath 151. In some other embodiments, the locking button 47 is slidably mounted on an upper side of the housing 451.

All the components of the pruner 1 can be manufactured by any materials that are suitable for endurable use. The shape and dimension of each component can vary from the preferred embodiments shown herein within the scope of the disclosure.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations and systems described herein may be used alone or in combination with other configurations and systems. It is to be expected that various equivalents, alternatives and modifications are possible within the scope of the foregoing description.

Any version of any component of the disclosure may be used with any other component of the disclosure. The elements described herein can be used in any combination whether explicitly described or not.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

The systems of the present disclosure can comprise, consist of, or consist essentially of the essential elements and limitations described herein, as well as any additional or optional components, or limitations described herein or otherwise useful in the art. The disclosure provided herein suitably may be practiced in the absence of any element which is not specifically disclosed herein.

While this disclosure may be embodied in many forms, what is described in detail herein is a specific preferred embodiment of the disclosure. The present disclosure is an exemplification of the principles of the disclosure is not intended to limit the disclosure to the particular embodiments illustrated. It is to be understood that this disclosure is not limited to the particular examples, configurations, and materials disclosed herein as such configurations and materials may vary somewhat. It is also understood that the terminology used herein is used for the purpose of describing particular embodiments only and is not intended to be limiting since the scope of the present disclosure will be limited to only the appended claims and equivalents thereof.

What is claimed is:

1. A pruner comprising:
   a first unit having a first blade at a front portion thereof, a first pivot hole at a middle-front portion thereof, a first sliding groove at a middle-rear portion thereof, a first transmission gear at a middle portion thereof and positioned for engagement with a second transmission gear of a driving unit, and a first handle at a rear portion thereof;
   a second unit having a second blade at a front portion thereof, a second pivot hole at a middle-front portion thereof, a second sliding groove at a middle-rear portion thereof, and a third pivot hole at a rear portion thereof; and the driving unit having the second transmission gear at a front portion thereof, a fourth pivot hole at a middle portion thereof and a second handle at a rear portion thereof; wherein:

the first unit is pivotally connected to the second unit by aligning the first pivot hole with the second pivot hole to allow connection by a first pivot unit;

the second unit is pivotally connected to the driving unit by aligning the third pivot hole with the fourth pivot hole to allow connection by a second pivot unit; and the second blade of the moveable unit is driven by the second handle of the driving unit through the engagement of the second transmission gear and the first transmission gear to pivotally move toward the first blade to complete a cut; and wherein, when the first handle and the second handle are closed, the first sliding groove overlaps with the second sliding groove, and as the second handle, a relative position between the first and second sliding grooves changes, thereby altering a location of the overlap or decreasing a degree of the overlap.

2. The pruner of claim 1, further comprising a leaf spring between the first unit and the second unit that acts upon the second unit to move the second handle away from the first handle after the cut.

3. The pruner of claim 1, further comprising a variable gate opening button penetrating the first sliding groove and the second sliding groove, wherein the variable gate opening button has a first end penetrating the first sliding groove and a second end penetrating the second sliding groove.

4. The pruner of claim 3, wherein the first sliding groove has a rear end and a front end, and wherein the variable gate opening button is selectively positionable at a first position in which the first end of the variable gate opening button engages the rear end of the first sliding groove, at a second position in which the first end of the variable gate opening button engages the front end of the first sliding groove, or at any intermediate position between the first and the second positions to adjust span between the first handle and the second handle.

5. The pruner of claim 4, wherein the pruner has a smallest span between the first handle and the second handle when the variable gate opening button is positioned at the first position.

6. The pruner of claim 5, wherein, when the variable gate opening button is at the first position, the second handle moves away from the first handle to reach a maximum distance when the second end of the variable gate opening button engages a rear position of the second sliding groove to prohibit further movement of the second blade away from the first blade.

7. The pruner of claim 4, wherein the pruner has a largest span between the first handle and the second handle when the variable gate opening button is positioned at the second position.

8. The pruner of claim 7, wherein, when the variable gate opening button is at the second position, the second handle moves away from the first handle to reach a maximum distance when the second end of the variable gate opening button engages a front position of the second sliding groove to prohibit further movement of the second blade away from the first blade.

9. The pruner of claim 4, wherein the pruner has an intermediate span between the first handle and the second handle when the variable gate opening button is positioned at an intermediate position between the first position and the second position.

10. The pruner of claim 9, wherein, when the variable gate opening button is at the intermediate position, the second handle moves away from the first handle to reach a maximum distance when the second end of the variable gate opening button engages an intermediate position of the second sliding groove to prohibit further movement of the second blade away from the first blade.

11. The pruner of claim 1, further comprising a locking groove at a middle portion of the second unit and disposed on a side opposite the second blade.

12. The pruner of claim 11, further comprising a locking button having a front portion engaging with the locking groove to prohibit movement of the second blade of the second unit relative to the first blade of the first unit.

13. The pruner of claim 1, wherein the first blade is a hook without a sharp portion.

14. The pruner of claim 1, wherein the first handle is coupled with a first handle sheath and the second handle is coupled with a second handle sheath for holding by a user.

15. The pruner of claim 1, further comprising a housing that covers a middle portion of the first unit and the second unit, wherein the housing comprises an opening through which the first sliding groove is exposed and accessible.

* * * * *